United States Patent [19]

Aapro

[11] 3,860,832

[45] Jan. 14, 1975

[54] BIONIC LOGIC DEVICE

[75] Inventor: Aarno Aapro, Orrville, Ontario, Canada

[73] Assignee: Bionic Industries Limited, Ontario, Canada

[22] Filed: July 2, 1973

[21] Appl. No.: 376,010

[52] U.S. Cl. .................. 307/232, 307/215, 328/75, 328/110

[51] Int. Cl. .................................. H03k 5/20

[58] Field of Search ......... 340/172.5; 307/215, 232, 307/247, 291, 299 A; 315/318; 328/109, 110, 151, 72, 75

[56] References Cited

UNITED STATES PATENTS

| | | | |
|---|---|---|---|
| 3,475,062 | 10/1969 | Crittenden et al. | 328/109 |
| 3,629,712 | 12/1971 | Clark | 307/232 |
| 3,641,443 | 2/1972 | Zerby | 307/232 |
| 3,666,968 | 5/1972 | Krocheski | 307/215 |
| 3,676,712 | 7/1972 | Schenel, Jr. | 307/291 |
| 3,744,029 | 7/1973 | Nyman | 340/172.5 |

*Primary Examiner*—Harvey E. Springborn
*Attorney, Agent, or Firm*—David W. Wong

[57] ABSTRACT

This specification describes an electronic logic device. The device is responsive to the sequence in which its inputs are actuated to provide a corresponding integer output. The basic circuit of the device comprises a first latch means and a second latch means cross-coupled together. The input to the second latch means and the output of the first latch means are connected to the inputs of a first NAND circuit. The input of the first latch means and the output of the second latch means are connected to the inputs of a second NAND circuit. An integer output signal will be present at the output of the first NAND circuit when the input to the first latch means is actuated before the input of the second latch means, and another integer output signal will be present at the output of the second NAND circuit when the input to the second latch means is actuated prior to the actuation of the input of the first latch means.

10 Claims, 4 Drawing Figures

BIONIC LOGIC DEVICE

BACKGROUND OF THE INVENTION

This invention relates to electronic logic devices and particularly relates to a sequence sensitive logic device for providing a predetermined integer output with respect to a predetermined sequence in which the inputs of the device are actuated.

Binary devices such as flip flop circuits are commonly used as an input responsive device. A typical example of such device in a block form includes two inputs A and B, and two outputs X and Y. The output conditions responsive to the input conditions are as follows:

| INPUT | | OUTPUT | |
|---|---|---|---|
| A | B | X | Y |
| 0 | 0 | 0 | 0 |
| 1 | 0 | 1 | 0 |
| 0 | 1 | 0 | 1 |
| 1 | 1 | indeterminate | |

In such device, when no input is present, there is no output in either X or Y output terminals. When an input is present in either A or B, a corresponding output will occur in either X or Y accordingly to indicate the respective input condition. However, when both inputs A and B are actuated, the device will go into an indeterminate state. Therefore, such device is unable to respond to an input condition in which both inputs are actuated. Due to this limitation, other complicated circuits must be incorporated to such device to enable it to respond to all possible input conditions. The additional circuits are usually very complex in structure and thus they increase the complexity of the binary device. One form of such additional circuit is the inclusion of a clock circuit in the binary device. The clock circuit provides a reference timing pulse train against which the inputs of the binary device are compared so as to determine their sequence of actuation. Comparison circuits must be incorporated to indicate the sequence in which the inputs of the binary device are actuated.

The inclusion of additional circuits complicates the structure of the binary device, and since a large number of such binary device is normally required in an information processor, the additional circuits render it difficult or even economically if not technically infeasible to build such processor.

According to the present invention, a so called bionic device is provided. The bionic device has the capability of responding to the sequence in which its inputs are both actuated. The device is simple in structure. Such device may be regarded as operating in a base 3 operation, namely, there would only be a single integer output for indicating each input condition indicating either 1 2 or 2 1. That is, both inputs of the device are actuated but in the sequence of one after the other. The condition 1 2 indicates that one input indicated 1 is actuated first, and the other input indicated 2 is actuated after the first input while the first input is still on. The condition 2 1 indicates the reverse sequence.

In a more particular embodiment, the bionic device of the present invention has the capability not only to provide the base 3 operation indicated above but also to provide an integer output to indicate the binary input conditions.

The device according to the present invention thus is responsive to more input conditions than conventional binary logic devices so as to provide an integer output indicating the respective input conditions not heretofore provided by binary devices.

The device according to the present invention may be useful in providing a vector indication of a series of operations. For example, it may be incorporated in a control system for a rotating shaft to provide an integer indicative of the direction of rotation. Sensing devices such as transducers may be located on the shaft such that when it rotates in one direction the sensing devices provide inputs to the bionic device in a first sequence, and the bionic circuit will provide an integer output to indicate that direction of rotation. The inputs to the bionic device will be in the reverse sequence when the shaft is rotating in the other direction and a second integer output will be provided by the bionic circuit to indicate the reverse condition.

The bionic device may be used in a character recognition system to indicate the direction in which the scanner is sweeping the character. In this manner, a character may be scanned in more than one direction to provide a more positive recognition of the character. A plurality of such bionic device may be connected in cascade to provide a complex bionic device having a plurality of input terminals and a plurality of output terminals such that a single integer output will be present at a single predetermined output terminal to indicate the sequence of actuation of at least two input terminals. Such complex bionic device is most useful in data processing systems in which the bionic device will provide a single integer output to indicate the identity of a certain input pattern or condition. Thus, it eliminates the need of a comparison system in common data processing systems in which the pattern of input condition must be compared with a record of reference patterns to determine the identity of the input pattern before an integer output may be provided to indicate that identity.

Furthermore, due to the ability to respond to more input conditions so as to provide an integer output, the bionic device according to the present invention is capable of providing logic decisions for more input conditions than the common binary logic devices. Thus, it may be used to simplify the structure of many logic systems in information processors.

SUMMARY OF THE INVENTION

It is a principal object of the present invention to provide a bionic device which is responsive to the sequences in which its inputs are actuated to provide a corresponding predetermined integer output.

It is another object of the present invention to provide a bionic device which is simple in circuit structure.

It is still another object of the present invention to provide a logic device which is adaptable in an integrated circuit structure.

Briefly, the sequence responsive device of the present invention comprises two strobed inverters each of which has an input terminal, a set terminal and an output terminal. Each set terminal of each strobed inverter is connected to the output terminal of the other strobed inverter. The input terminals of the strobed inverters are adapted to receive an actuation signal from two driver circuits respectively. The driver circuits are selectively actuated to provide the actuation signals by the supply of two input signals respectively through two input inverters. The output terminals of the strobed inverters are respectively connected to one input terminal of two NAND gates each of which has two input terminals and one output terminal. The other input terminals of the two NAND gates are adapted to receive the respective input signals. When the input signals are two negative signals fed to the input inverters, one later than the other, a positive voltage will be present at the output terminal of a selected one of the NAND gates in response to and indicative of the sequence in which the input signals are fed to the input inverters. The positive voltage at the output terminal of the NAND gates are converted to a negative voltage by two output inverters respectively.

BRIEF DESCRIPTION OF THE DRAWINGS

A specific embodiment solely by way of example of the present invention will now be described with reference to the accompanying drawings in which.

DESCRIPTION OF PREFERRED EMBODIMENT

Figure 1:
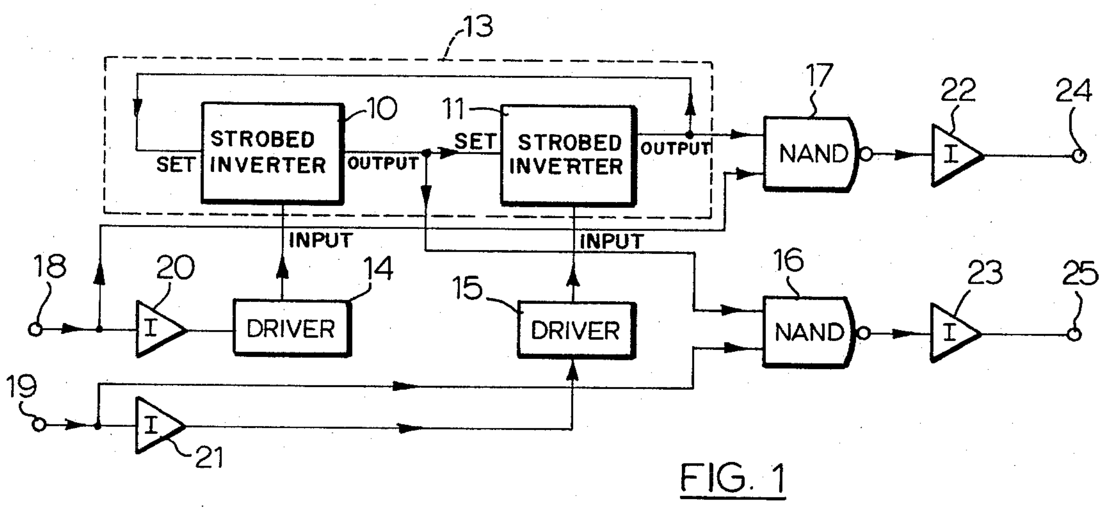
FIG. 1 is a schematic block diagram of a bionic device according to the present invention.

Referring to the drawings wherein similar reference numerals indicate similar parts, two latch means such as strobed inverter circuits 10 and 11 are cross-coupled to form a compound latch circuit 13. The output of the strobed inverter circuit 11 is fed back to the inverter circuit 10, and the strobed inverter circuit 11 is also responsive to the output of strobed inverter circuit 10. Inverter circuits 10 and 11 are driven by power drivers 14 and 15 respectively. The outputs of strobed inverter circuits 10 and 11 are fed to NAND gates 16 and 17 respectively. Such NAND gates will provide a change in its output state when both inputs are actuated. Inputs 18 and 19 are provided through input inverter circuits 20 and 21. Output inverter circuits 22 and 23 reverse the outputs of NAND gates 17 and 16 such that a negative voltage therein represents a 1 output pulse in either one of the output terminals 24 and 25.

When a negative low voltage input representing a 1 is present at input 18, the input is inverted to a positive pulse to actuate driver circuit 14. Driver circuit 14 in turn supplies a large negative pulse to actuate strobed inverter circuit 10 of compound latch circuit 13, so that a negative pulse is fed to one of the inputs of NAND gate 16. Since no input is present at input 19, the other input of NAND gate 16 is zero. Therefore, the input condition to NAND gate 16 changes from 0 0 to 1 0 and the output remains the same so that there is no output at output terminal 25.

Since no input is present at input terminal 19, strobed inverter circuit 11 of latch circuit 13 is not actuated, and the input at input terminal 18 changes the input condition of NAND gate 17 from 0 0 to 1 0 in which the NAND gate 17 output condition remains the same. Therefore, no output is present at output terminal 24.

The strobed inverter circuit 10 will remain actuated as long as the negative pulse is maintained at input terminal 18. If another negative pulse representing the state of 1 is fed to input terminal 19 while terminal 18 is still being actuated, strobed inverter circuit 11 is also actuated. However, the output of strobed inverter circuit 11 remains unchanged due to the latching action of strobed inverter circuit 10. Therefore, the inputs to NAND gate 17 remain the same and there is no output at terminal 24.

Strobed inverter circuit 11 provides a positive feedback to strobed inverter circuit 10, but such feedback will not have any effect on the output of strobed inverter circuit 10. Similarly, the actuation of input terminal 19 subsequent to input terminal 18 has no effect on the output of strobed inverter circuit 11. Therefore, the output of strobed inverter circuit 10 remains at a negative potential which was set by the first actuation of input terminal 18. The inputs of NAND gate 16 thus receive a negative input from the output of strobed inverter circuit 10 and another negative input from the input terminal 19 so as to provide a positive output. The positive output is inverted by output inverter 23 to a negative pulse to indicate a 1 condition at output terminal 25.

The above operation is reversed if input terminal 19 is actuated first and input terminal 18 is actuated subsequently.

In the above manner, an output is present only at output terminal 25 to represent a 1 condition if input terminal 18 is actuated first and input terminal 19 is actuated subsequently while input terminal 18 is still being actuated, and an output is present only at output terminal 24 to represent a 1 condition therein if input terminal 19 is actuated first and input terminal 18 is actuated subsequently while input terminal 19 is still being actuated. This operation is shown in the following truth table:

| INPUT | | OUTPUT | |
|---|---|---|---|
| 18 | 19 | 25 | 24 |
| 0 | 0 | 0 | 0 |
| 1 | 0 | 0 | 0 |
| 1 | 2 | 1 | 0 |
| 0 | 1 | 0 | 0 |
| 2 | 1 | 0 | 1 |

wherein the numeral 2 indicates that the input is being actuated subsequent to the input indicated as 1.

Figure 2:
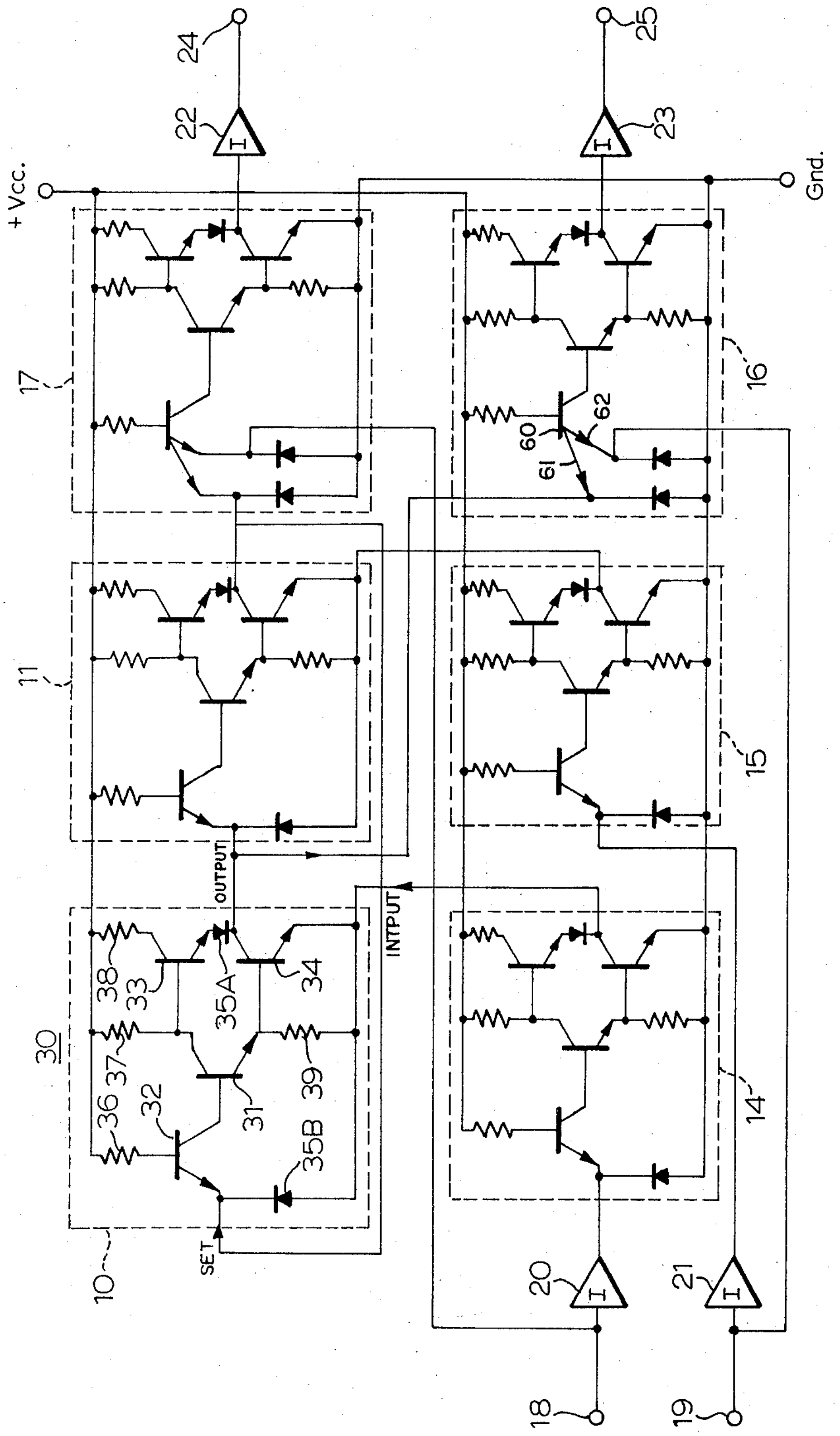
FIG. 2 is a schematic circuit diagram of the bionic device.

An exemplary electrical circuit is shown in FIG. 2 in which the driver circuits and the inverter circuits may be constructed by a similar transistor circuit 30. It will be appreciated that due to the uniformity of circuit construction such transistor circuit may be fabricated by integrated circuit technology.

The strobed inverter is shown by transistor circuit 30 which includes NPN transistor 31. The base of transistor 31 is connected to the collector of a second NPN transistor 32. The emitter of transistor 32 forms the set terminal of the strobed inverter. The collector and emitter of transistor 31 are respectively connected to the base of two serially connected NPN transistors 33 and 34. The emitter of transistor 34 forms the input terminal of the strobed inverter and the collector of transistor 34 forms the output terminal of the strobed inverter. A blocking diode 35A is connected between the emitter of transistor 33 and the collector of transistor 34. A blocking diode 35B is connected between the set terminal and the input terminal. The bias voltage Vcc is provided to the base of transistor 32, the collector of transistors 31 and 33 through resistors 36, 37 and 38 respectively. A resistor 39 connects between the emitter of transistor 31 to the input terminal.

The NAND gate 16 or 17 may also be fabricated by a transistor circuit similar to transistor circuit 30 as shown in FIG. 2, except the input transistor is a multiple-emitter transistor 60 which has two parallel emitters 61 and 62 which form the input terminals of the NAND gate.

It is apparent to one skilled in the art that due to the uniformity of the circuit structure, the bionic circuit according to the present invention may be fabricated by using integrated circuit method to produce it cheaply and in mass production process.

Figure 3:
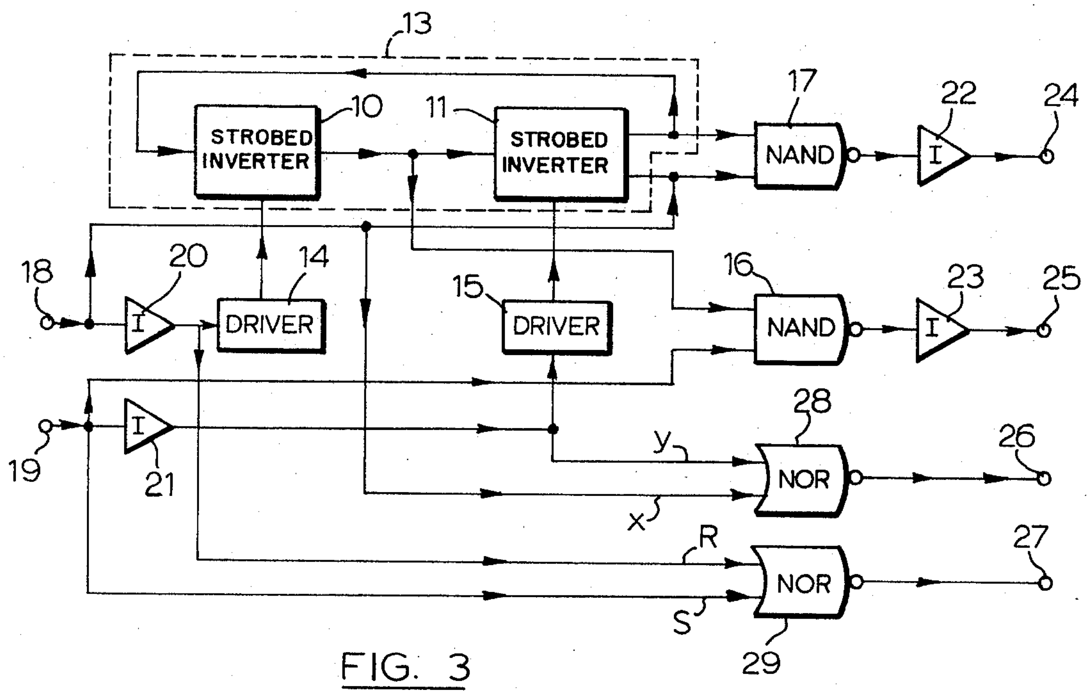
FIG. 3 is a schematic block diagram of a composite bionic-binary device according to the present invention.

NOR gates 28 and 29 may be incorporated in the bionic circuit of FIG. 1 as shown in FIG. 3 to obtain also a binary operation. The NOR gates 28 and 29 are conventional NAND-NOR gates. However, under the negative logic operation of the present invention these NAND-NOR gates are operated as NOR gates. Each NOR gate 28 and 29 will provide an integer output signal to indicate the output condition of 1 when both of its inputs are positive.

As shown in FIG. 3, the input X of NOR gate 28 is connected to the input terminal 18 and the other input Y is connected to the output of input inverter circuit 21. Similarly, the input S of NOR gate 29 is connected to input terminal 19 and the other input R is connected to the output of input inverter circuit 20.

Under the condition when no input is present at input terminals 18 and 19, the output terminals of inverters 20 and 21 are negative, and there is no voltage in input terminal X and S of NOR gates 28 and 29. Therefore, one of the input terminals of both NOR gates 28 and 29 is negative (1 condition) while the other input terminal is zero (0 condition, similar to positive voltage condition). Therefore, the output terminals 26 and 27 are at the 0 condition. When a negative voltage representing a 1 input signal is present at input terminal 18, the input condition changes the output of inverter 20 to positive voltage (i.e., 0 condition) which is fed to input R of NOR gate 29. This removes the normally present negative voltage at the output terminal of inverter 20, thus the voltage at input R of NOR gate 29 becomes positive, letting output of NOR gate 29 become negative. Therefore, a negative output is present at output terminal 27 to indicate a 1 condition therein. Similarly, when only input terminal 19 is actuated, input Y of NOR gate 28 is in 0 condition so that an integer output is present in the output terminal 26.

If both input terminals 18 and 19 are actuated, regardless of the sequence of actuation, input X of NOR gate 28 and input S of NOR gate 29 will receive a negative signal. Therefore, no output signal will be present in either output terminal 26 or output terminal 27.

The following truth table shows the operation of the circuit shown in FIG. 3.

| INPUT | | OUTPUT | | | |
|---|---|---|---|---|---|
| 18 | 19 | 27 | 26 | 25 | 24 |
| 0 | 0 | 0 | 0 | 0 | 0 |
| 1 | 0 | 1 | 0 | 0 | 0 |
| 0 | 1 | 0 | 1 | 0 | 0 |
| 1 | 2 | 0 | 0 | 1 | 0 |
| 2 | 1 | 0 | 0 | 0 | 1 |

Figure 4:
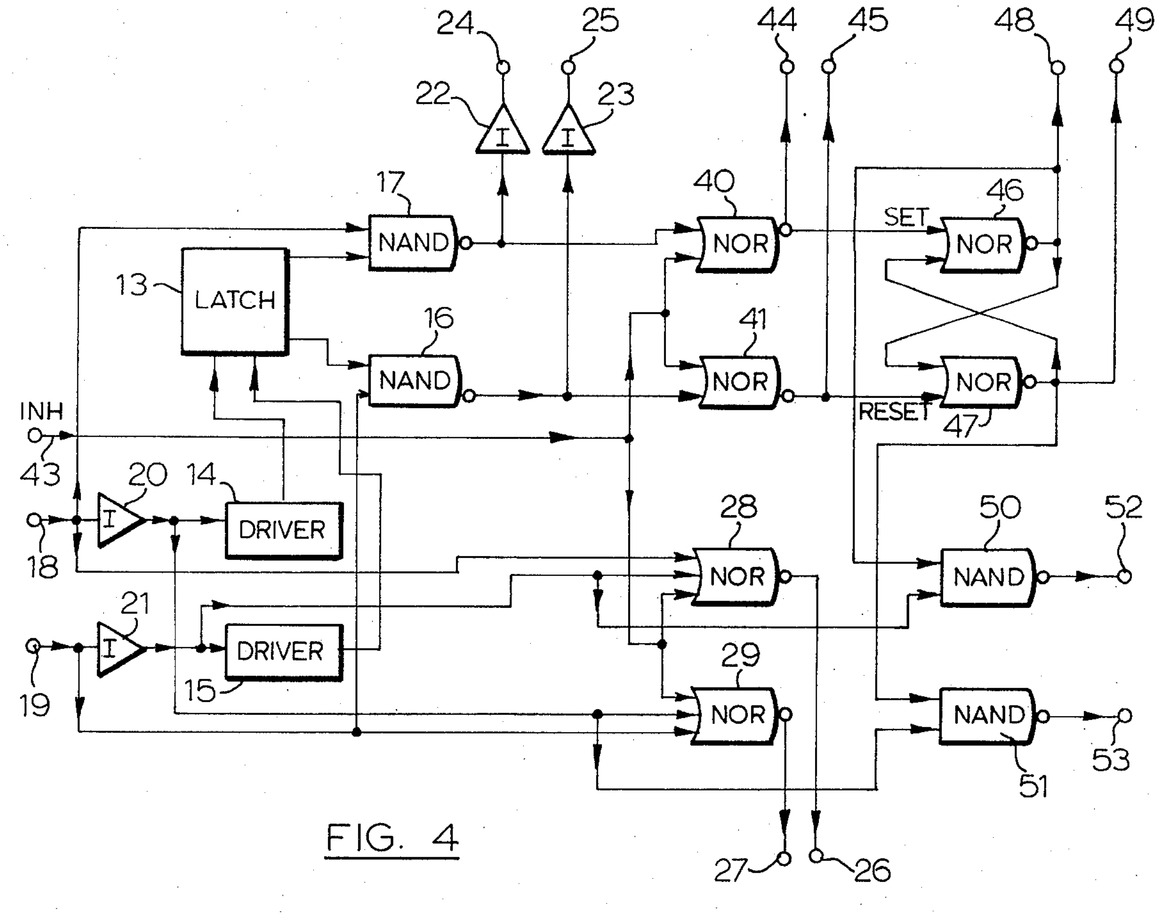
FIG. 4 is a schematic block diagram of a further bionic-binary device according to the present invention.

Referring to FIG. 4, there is shown a schematic block diagram of a composite logic device according to the present invention. A binary memory circuit and a bionic memory circuit are incorporated in the basic bionic device. Additionally, an inhibitor circuit is also incorporated therein. The inhibitor circuit is directly coupled to the outputs of NAND gates 16 and 17. The inhibitor circuit comprises of two NOR gates 40 and 41. One input of NOR gate 40 is connected to the output of NAND gate 17 of the basic bionic circuit. One input of NOR gate 41 is connected to the output of NAND gate 16. The other input of NOR gates 40 and 41 is commonly connected together to an inhibit input terminal 43.

The inhibitor circuit will normally provide a similar output condition in its output terminals 44 and 45. That is, when an integer output is present at bionic output terminal 24, then a similar output will be present at inhibitor output terminal 44, due to that the same output is fed to one of the input of NOR gate 40. Similarly, an integer output will be present at inhibitor output terminal 45 when an integer output is present at bionic output terminal 25. However, when the input 43 of the inhibitor is actuated, the other input to NOR gates 40 and 41 is actuated so that no output will be present in any of the output terminals of the inhibitor.

The inhibitor input may also be fed to NOR gates 28 and 29, so that the binary outputs may be inhibited by activating the inhibit inputs of these NOR gates.

A binary memory circuit is comprised of a set-reset flip-flop circuit which may be incorporated in the compound bionic circuit shown in FIG. 4. The flip-flop may be in either 1 condition or 0 condition. In the 1 condition, an output is present in output terminal 48 and the 0 condition, an output is present only in output terminal 49. If the flip-flop is suitably in a 1 condition, only an input at the SET terminal of NOR gate 46 will reverse the condition of the flip-flop to a 0 condition such that an output is present at output terminal 49. If the flip-flop is initially in the 0 condition, i.e., an output is present at terminal 49, only an input at the RESET terminal of NOR gate 47 will reverse the flip-flop to a 1 condition such that an output is present at output terminal 48. Therefore, the binary memory circuit will reverse its output condition in the above input conditions and it will remain unchanged from its initial condition in all other input conditions.

Also, a bionic memory may be incorporated in the compound bionic circuit. The bionic memory is comprised of two NAND gates 50 and 51. One input of NAND gate 50 is connected to the output terminal 48 of the binary memory and the input of NAND gate 50 is connected to the output of input inverter circuit 21. Similarly, one input of NAND gate 51 is connected to the output terminal 49 of the binary memory, and the other input of NAND gate 51 is connected to the output of input inverter circuit 20.

Since one of the inputs of NAND gates 50 and 51 is connected to binary memory output terminals 48 and 49 respectively, one of these inputs will have a negative voltage input depending on the condition of the binary memory. Therefore, the bionic memory follows a logic sequence of operation. The sequence begins with no input at any of the input terminals 18 or 19 of the bionic circuit. Under this condition, no output is present in any of the output terminals 52 or 53 of the bionic memory. When input terminal 18 is actuated first and input terminal 19 is actuated subsequently, as described above, an output will be present at output terminals 25 and 45, and the binary memory will be set such that there is a negative output at output terminal 48. This negative output will be fed to NAND gate 50, while a positive input voltage is fed to the other input of NAND gate 50 from input inverter circuit 21. Therefore, a positive output is present at output terminal 52 of NAND gate 50. Since the binary memory is set at the 1 condition, there is no output at output terminal 49 of the binary memory, so that there is no input voltage supplied to NAND gate 51 from the binary memory, while the other input of NAND gate 51 is positive due to a positive voltage being fed thereto from the output of input inverter circuit 20. Therefore, there is a negative output voltage in output terminal 26 of the bionic memory. If, after the above input conditions, only the input terminal 18 is actuated, then since binary memory is initially set at the 1 condition, a positive input will continue to be fed from terminal 49 to the input of NAND gate 51 and a positive input is fed to the other input of NAND gate 51 from the output of input inverter circuit 20. Therefore, a negative output continues to exist at output terminal 53, since input is fed to NAND gate 50 from the binary memory because the latter is in the 1 condition. Therefore, there is no output at output terminal 52.

If a negative input is supplied now to input terminal 19 instead of input terminal 18, binary memory would still be in the 1 condition and a positive voltage is fed from output terminal 49 to the input of NAND gate 51, but there is a negative voltage at the other input of NAND gate 51. Therefore, no output voltage will be present at output terminal 53. Also, since input terminal 18 is not actuated, there is an input voltage to NAND gate 50, therefore there is no output voltage at output terminal 52.

If now input terminal 18 is actuated and input terminal 19 is actuated subsequently both with negative pulses, a negative voltage appears at output terminal 44 which resets the binary memory into a 0 condition. Therefore, a positive voltage is supplied from output terminal 48 to the input of NAND gate 50 while a positive voltage is supplied from input inverter circuit 21 to the other input of NAND gate 50. Therefore, a negative output is present at output terminal 52. Also, since negative input voltage is supplied to NAND gate 51 from the binary memory, there is no output voltage at output terminal 53.

If now a negative voltage is fed only to input 19, a positive input voltage will be supplied to one of the input of NAND gate 50, the other input of NAND gate 50 will continue to receive a positive voltage from the binary memory due to it being still in the 0 condition. Therefore, a negative output voltage continues to exist at output terminal 52. Since negative input voltage exists in NAND gate 50, there is no output at output terminal 52.

If now a negative voltage is provided only in input 18, a positive voltage will be supplied from input inverter circuit 20 to one of the input of NAND gate 51. However, since the binary memory is still in the 0 condition, there is an input voltage in the other input of NAND gate 51, so that there is no output in output terminal 53. A positive voltage is fed from the binary memory to one of the input of NAND gate 50, but there is a voltage in the other input so that there is no output voltage in output terminal 52 as well. The above logic sequence of operation of the bionic memory is tabulated in the following truth table:

| INPUT | | OUTPUT | |
|---|---|---|---|
| Input Terminal 19 | Input Terminal 18 | Output Terminal 53 | Output Terminal 52 |
| 0 | 0 | 0 | 0 |
| 1 | 2 | 1 | 0 |
| 0 | 1 | 1 | 0 |
| 1 | 0 | 0 | 0 |
| 2 | 1 | 0 | 1 |
| 1 | 0 | 0 | 1 |
| 0 | 1 | 0 | 0 |

The various operations of the compound bionic device as shown in FIG. 4 are shown in the following truth table.

| INPUT | | INHIBITOR | OUTPUT | | | | | | | | | |
|---|---|---|---|---|---|---|---|---|---|---|---|---|
| | | | BINARY | | BINARY MEMORY | | BIONIC | | INHIBITED BIONIC | | BIONIC MEMORY | |
| 19 | 18 | 43 | 26 | 27 | 49 | 48 | 24 | 25 | 44 | 45 | 53 | 52 |
| 0 | 0 | 0 | 0 | 0 | * | * | 0 | 0 | 0 | 0 | 0 | 0 |
| 1 | 0 | 0 | 1 | 0 | * | * | 0 | 0 | 0 | 0 | + | + |
| 0 | 1 | 0 | 0 | 1 | * | * | 0 | 0 | 0 | 0 | + | + |
| 1 | 2 | 0 | 0 | 0 | 1 | 0 | 1 | 0 | 1 | 0 | 1 | 0 |
| 2 | 1 | 0 | 0 | 0 | 0 | 1 | 0 | 1 | 0 | 1 | 0 | 1 |
| 1 | 0 | 1 | 0 | 0 | * | * | 0 | 0 | 0 | 0 | * | * |
| 0 | 1 | 1 | 0 | 0 | * | * | 0 | 0 | 0 | 0 | * | * |
| 1 | 2 | 1 | 0 | 0 | * | * | 1 | 0 | 0 | 0 | * | * |
| 2 | 1 | 1 | 0 | 0 | * | * | 0 | 1 | 0 | 0 | * | * |
| 0 | 0 | 1 | 0 | 0 | * | * | 0 | 0 | 0 | 0 | * | * |

In the above truth table:
0 indicates a high level positive voltage
1 indicates a low level negative voltage
2 indicates a low level input actuated subsequent to the other input.
+ indicates there is an output voltage only if the previous input conditions follow the proper logic sequence.
* indicates there is no change from the previous condition Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

What I claim as new and desire to protect by Letters Patent of the United States is:

1. A sequence responsive device comprising at least one latch means which comprises a first strobed inverter means and a second strobed inverter means, each of said first and second strobed inverter means having an input terminal, a set terminal and an output terminal, said set terminal of said first strobed inverter means being connected to the output terminal of said second strobed inverter means and said set terminal of said second strobed inverter means being connected to the output terminal of said first strobed inverter means, the input terminal of said first strobed inverter means being connected to a first driver means adapted to provide an actuation signal to said first strobed inverter means, said first driver means being operatively actuated by a first input signal, the input terminal of said second strobed inverter means being connected to a second driver means adapted to provide an actuation signal to said second strobed inverter means, said second driver means being operatively actuated by a second input signal, a first NAND gate and a second NAND gate, each of said NAND gates having a first input terminal, a second input terminal and an output terminal, the output terminal of said first strobed inverter means being connected to the first input terminal of said second NAND gate, the output terminal of said second strobed inverter means being connected to the first input terminal of said first NAND gate, said second input terminal of said first NAND gate being operatively connected to receiving said first input signal, and said second input terminal of said second NAND gate being operatively connected to receive said second input signal whereby an output signal is manifested at the output terminal of a selected one of said first or second NAND gate indicative of the sequence of actuation of said first input signal and second input signal.

2. A sequence responsive device according to claim 1 wherein said first input signal and said second input signal are fed to said first driver means and said second driver means through a first input inverter means and a second input inverter means respectively.

3. A sequence responsive device according to claim 2 including a first output inverter means connected to the output terminal of said first NAND gate and a second output inverter means connected to the output terminal of said second NAND gate.

4. A sequence responsive device according to claim 3 wherein each of said first and second strobed inverter means comprises a first transistor, a second transistor, the collector of said first transistor forming the output terminal of said strobed inverter means, the emitter of said first transistor forming the input terminal of said strobed inverter means, a first diode connected between the collector of said first transistor and the emitter of said second transistor, said input terminal also being connected to the base of said first transistor through a first resistance means, a collector of said second transistor being connected to a biassing voltage through a second resistance means, a third transistor having an emitter connected to the base of said first transistor and a collector connected to the base of said second transistor, the collector of said third transistor being connected to said biassing voltage through a third resistance means, a fourth transistor having an emitter forming the set terminal of said strobed inverter means, the collector of said fourth transistor being connected to the base of said third transistor, a second diode connected between said set terminal and said input terminal, the base of said fourth transistor being connected to said biassing voltage through a fourth resistance means.

5. A sequence responsive device according to claim 3 wherein each of said NAND gate comprises a first transistor having a first emitter forming the first input terminal of said NAND gate and a second emitter forming the second input terminal of said NAND gate, the base of said first transistor being connected to a biassing voltage source through a first biassing resistance means, said first input terminal and second input terminal being connected to ground through a first grounding diode and a second grounding diode respectively, a second transistor having a base connected to the collector of said first transistor, the collector of said second transistor being connected to said biassing voltage source through a second biassing resistance means and the emitter of said second transistor being connected to ground through a grounding resistance means, a third transistor and a fourth transistor, the base of said third transistor being connected to the collector of said second transistor, the collector of said third transistor being connected to said biassing voltage source through a third biassing resistance means, the collector of said fourth transistor forming the output terminal of said NAND gate, the emitter of said third transistor being connected to said output terminal through a diode, the emitter of said fourth transistor being directly connected to ground.

6. A sequence responsive device according to claim 3 including a first NOR gate and a second NOR gate, each of said NOR gates having a first input terminal, a second input terminal and an output terminal, said first input terminal of said first NOR gate being adapted to receive said first input signal and said second input of said first NOR gate being connected to the output terminal of said second input inverter means, said first input terminal of said second NOR gate being adapted to receive said second input signal and said second input terminal of said second NOR gate being connected to the output terminal of said first input inverter means whereby when said first input signal is a negative signal, a negative binary output signal is present at the output terminal of said second NOR gate and when said second input signal is a negative signal, a negative binary output signal is present at the output terminal of said first NOR gate.

7. A sequence responsive device according to claim 6 further comprising an inhibit circuit including a third NOR gate and a fourth NOR GATE, each of said NOR gates having a first input terminal, a second input terminal and an output terminal, said first input terminal of said third and fourth NOR gates being adapted to receive an inhibit signal, said second input terminal of said third NOR gate being connected to the output terminal of said first NAND gate and said second terminal of said fourth NOR gate being connected to the output terminal of said second NAND gate whereby selective output signals will be present at the output terminal of said third and fourth NOR gates responsive to the presence of output signals at the output terminal of said first and second NAND gates and the selective actuation of said inhibit signal.

8. A sequence responsive device according to claim 7 wherein each of said first NOR gates and second NOR gates includes a third input terminal connected to each other and are adapted to receive said inhibit signal whereby the presence of the binary output signals at the output terminals of said first NOR gate and second NOR gate is selectively controlled by the selective actuation of said inhibit signal.

9. A sequence responsive device according to claim 8 including a fifth NOR gate and a sixth NOR gate each having a first input terminal, a second input terminal and an output terminal, said first input terminal of said fifth NOR gate being connected to the output terminal of said third NOR gate, said second input terminal of said fifth NOR gate being connected to the output terminal of said sixth NOR gate, said first input terminal of said sixth NOR gate being connected to the output terminal of said fifth NOR gate and said second input terminal of said sixth NOR gate being connected to the output terminal of said fourth NOR gate whereby a constant output signal will be present at the output terminal of said fifth NOR gate in response to a first repeating sequence of actuation of said first input signal preceding said second input signal, and a constant output signal will be present at the output terminal of said sixth NOR gate in response to a second repeating sequence of actuation of said second input signal preceding said first input signal.

10. A sequence responsive device according to claim 9 including a third NAND gate and a fourth NAND gate each having a first input terminal, a second input terminal and an output terminal, said first input terminal of said third NAND gate being adapted to receive the output signal from the output terminal of said fifth NOR gate, said second input terminal of said third NAND gate being connected to the output terminal of said second input inverter means, said first input terminal of said fourth NAND gate being adapted to receive the output signal from said output terminal of said sixth NOR gate and said second input terminal of said fourth NOR gate being connected to the output terminal of said first input inverter means.

* * * * *